(12) United States Patent
Reck et al.

(10) Patent No.: US 6,689,327 B1
(45) Date of Patent: *Feb. 10, 2004

(54) CATALYTIC CONVERTER FOR REDUCING HYDROCARBON IN THE EXHAUST GASES OF A MOTOR VEHICLE

(75) Inventors: Alfred Reck, Kürten (DE); Uwe Siepmann, Köln (DE)

(73) Assignee: EMITEC Gesellschaft fuer Emissionstechnologie mbH, Lohmar (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,953

(22) Filed: Feb. 17, 1998

Related U.S. Application Data

(63) Continuation of application No. PCT/EP96/03482, filed on Aug. 6, 1996.

(30) Foreign Application Priority Data

Aug. 16, 1995 (DE) .......................................... 195 30 142
Sep. 22, 1995 (DE) .......................................... 195 35 289

(51) Int. Cl.⁷ ............................ B01D 53/94; F01N 3/28
(52) U.S. Cl. ...................... 422/180; 422/174; 422/177
(58) Field of Search ........................... 422/174, 177, 422/171, 180, 190, 193, 222; 55/DIG. 30; 60/299, 301, 322; 502/527.22; 428/116, 592–593

(56) References Cited

U.S. PATENT DOCUMENTS

| | | | | |
|---|---|---|---|---|
| 3,770,389 A | * | 11/1973 | Kitzner et al. | 422/174 |
| 4,220,625 A | * | 9/1980 | Toh et al. | 422/180 |
| 4,282,186 A | * | 8/1981 | Nonnenmann et al. | 422/180 |
| 4,397,772 A | * | 8/1983 | Noakes et al. | 502/527.22 |
| 4,400,309 A | * | 8/1983 | McMahon et al. | 502/527.22 |
| 4,842,954 A | * | 6/1989 | Cyron et al. | 428/593 |
| 5,110,561 A | * | 5/1992 | Hitachi et al. | 422/180 |
| 5,151,254 A | * | 9/1992 | Arai et al. | 422/180 |
| 5,386,696 A | * | 2/1995 | Prigent et al. | 422/180 |

* cited by examiner

*Primary Examiner*—Hien Tran
(74) *Attorney, Agent, or Firm*—Laurence A. Greenberg; Werner H. Stemer; Ralph E. Locher

(57) ABSTRACT

A catalytic converter for vehicles with internal combustion engines which is especially suited for catalytically cleaning exhaust gas with large proportions of hydrocarbons. The converter includes a jacket tube, in which one or more metal sheets are disposed. The metal sheets are at least partially coated with a catalytically active material and they are disposed in the vicinity of an inner wall surface of the jacket tube. A predominant portion of the cross-sectional area of the jacket tube is free of metal sheets with catalytically active material. The metal sheets may be structured at least in partial regions, with corrugations and/or perforations. A catalytic converter assembly includes two converter reactors connected one after the other in the exhaust gas flow.

17 Claims, 3 Drawing Sheets

CATALYTIC CONVERTER FOR REDUCING HYDROCARBON IN THE EXHAUST GASES OF A MOTOR VEHICLE

CROSS-REFERENCE TO RELATED APPLICATION

This is a continuation of international application PCT/EP96/03482, filed Aug. 6, 1996 which designated the United States.

BACKGROUND OF THE INVENTION

FIELD OF THE INVENTION

The present invention pertains to catalytic exhaust purification, and, more specifically, to catalytic converters for vehicles with internal combustion engines, especially for catalytically cleaning exhaust gases with large proportions of hydrocarbons.

As the demands for cleaning motor vehicle exhaust gas become ever more stringent worldwide, numerous embodiments for catalytic converters have been developed. One type of catalyst has metal sheets, coated at least partially with catalytically active material and disposed in a jacket tube. For such catalytic converters, numerous structural forms with different structures of the metal sheets are known.

Although catalytic converters in which the catalytically active material is applied to metal sheets have very good properties with respect to heat conduction and heat distribution, in certain applications overheating can nevertheless occur because of the exothermal reaction in the catalyst. To avoid this, a catalytic converter has become known from German patent disclosure DE 36 35 993 A1 which leaves a central region of the cross-sectional area through which exhaust gas flows free, in order to avoid overheating. Such a honeycomb body is also known from European patent disclosure EP 0 270 856 A1.

In those prior art catalyst reactors, however, the goal is still to clean the greatest possible proportion of exhaust gas and to allow only a small portion to pass through unhindered through the central region, so as to avoid overheating in that region, as could occur if the honeycomb body entirely filled the exhaust gas cross section.

However, applications exist in which the exhaust gas of internal combustion engines contains such large proportions of hydrocarbons that even those prior art honeycomb bodies would overheat if they were to catalytically convert the hydrocarbon components. Certain older-model two-stroke engines, especially, produce hydrocarbon concentrations of up to 4% by volume in the exhaust gas which liberate very large amounts of heat in complete catalytic combustion. Although this could be controlled with large-volume converters, there is often not enough space available for this. Nevertheless, it is desirable to reduce this high proportion of pollutants at reasonable expense, so that at least certain minimum demands with regard to pollutant emissions can be met.

SUMMARY OF THE INVENTION

It is accordingly an object of the invention to provide a catalytic converter for reducing hydrocarbons in the exhaust gas of motor vehicles with internal combustion engines, which overcomes the above-mentioned disadvantages of the prior art devices and methods of this general type and which is enabled to at least partially convert exhaust gases having high hydrocarbon concentrations of 2% to 4% by volume, for instance, without becoming overheated. It is an attendant object to provide a structural configuration which is as simple as possible and which can be integrated into smaller vehicles.

With the foregoing and other objects in view there is provided, in accordance with the invention, a catalytic converter for a vehicle with an internal combustion engine, in particular for catalytically converting hydrocarbons in an exhaust gas with large proportions of hydrocarbons. The novel catalytic converter comprises:

- a jacket tube having a wall with an inner surface and defining therein a flow channel with a given cross-sectional area;
- a metal sheet disposed in a vicinity of the inner surface of the jacket tube, the metal sheet being at least partially coated with a catalytically active material and being disposed such that a predominant, contiguous central portion of the given cross-sectional area of the jacket tube remains free of the metal sheet;
- the metal sheet being structured and defining flow channels having a size and a shape corresponding to channels in a honeycomb body with a channel density of 25 to 200 cpsi, and the central portion being bounded by a structured surface of the metal sheet.

Tests have shown that for catalytic conversion of a considerable portion of hydrocarbons in an exhaust gas, it suffices to pass the exhaust gas through a jacket tube which in the vicinity of its inner surface has metal sheets (i.e. sheet metal layers) that are at least partially coated with catalytically active material, but the predominant portion of cross-sectional area of the jacket tube is free of such metal sheets. In a catalytically active material-coated honeycomb body that fills the entire cross section of a jacket tube, the strongest exothermic reaction takes place, in accordance with the flow profile, in the central region, specifically generally in a zone of the honeycomb body that is quite short axially. At the same time, the heat from the interior of the honeycomb body, because of its honeycomb structure, is very difficult to dissipate outward to the jacket tube.

Conversely, if the predominant portion of the cross-sectional area of the jacket tube is kept free sheet metal layers, and if such sheet layers with catalytically active material are disposed substantially in the vicinity of the inside surface of the jacket tube, then initially the heat produced by exothermic reactions can be more easily dissipated. In that case, because of diffusion processes in the exhaust gas flow, the catalytic reaction takes place not at an axially short zone but over the entire length of the coated metal sheet. This results the conversion of a considerable proportion of the hydrocarbons into harmless components (carbon dioxide and water).

To meet less-stringent exhaust gas regulations, even a single player of a metal sheet coated entirely or partially with catalytically active material can suffice. To increase the catalytically active surface area, the metal sheet may be structured at least in partial regions, especially in corrugated form. These structures may also be more complicated, examples being corrugations with transverse ribs, slits, or microstructures, or other geometries.

However, it is also possible to provide a smooth metal sheet which lies flush against the jacket tube.

Metal sheets can be secured to one another and/or to the jacket tube by brazing. Those skilled in the art of metal honeycomb bodies are fully appraised of all possible mounting and attachment techniques.

In particular, it suffices to braze a metal sheet in place at the end face of the jacket tube. It is also favorable to pretreat the metal sheet, for instance to soft-anneal it, so that an oxide film forms. Welding is also possible, however, for instance with spot welds.

For more stringent exhaust gas regulations, it may be necessary to dispose a plurality of sheet metal layers, for instance from two to six of them, in the vicinity of the inside surface of the jacket tube. These sheet or sheets are structured in such a way that they form channels through which the exhaust gas can flow. In particular, these layers may be formed by spirally winding up structured metal sheets, such as smooth and corrugated sheets.

The shape and size of the structures of the metal sheet should preferably be such that they form channels with a cross-sectional area corresponding to a typical honeycomb body with 25 to 200 cpsi (cells per square inch). This means that amplitudes in the corrugation of about 1.5 to 6 mm are formed, with typical corrugation shape. The precise form of the corrugation, however, is of less significance for the present invention, and it should be understood that numerous variations exist.

In accordance with an added feature of the invention, the conversion of exhaust gas is further improved by crosswise flows and turbulence, effected by perforation holes formed in the sheet metal. The holes may have a diameter of from 2 to 6 mm. A likewise turbulent flow is attained by winding the metal sheet in a coil. This offers the opportunity of making such a metal sheet from a single piece. Secondly, by suitable winding, it is assured that the exhaust gas flowing through or past the resultant gaps is adequately mixed. The rise of the coil winding is preferably such that the windings do not overlap but rather are spaced apart slightly, for instance by a distance of 1 to 10 mm. This makes it possible even for curved tubes to be lined with sheet layers.

In accordance with further features of the invention, the jacket tube of the combination may be cylindrical or it may widen conically. From European Patent EP 0 386 013 B1, the disposition of a diffusor or confusor upstream or downstream of the catalyst body is known. From German patent disclosure DE 37 19 773 A1, a carrier body for a catalytic reactor for exhaust gas purification is also known, which is conical and with which a likewise conical jacket sheath is associated. Even oval cross-sectional shapes of the jacket tube are possible. The foregoing disclosures are herewith incorporated by reference.

To enable better utilization of the available space, the catalyst region may also be extended to curved jacket tube regions. This is especially suitable for exhaust gas pipes in motor cycles, for instance.

In accordance with an additional feature of the invention, the material from which the sheet metal is made is high-temperature and corrosion-resistant material, especially materials such as the material 1.4767, or materials with similar properties.

In accordance with again an additional feature of the invention, the invention is particularly suitable as a combination of an above-described catalytic converter (hereinafter referred to as a precatalyst) and a downstream main catalytic converter. The precatalyst is preferably cylindrically or conically connected upstream of the downstream catalytic converter. In cold starting condition of an internal combustion engine, the light-off temperature of the main catalyst may thus be attained much more quickly, and along with this a better rate of conversion of the combustion gases. Moreover, the precatalyst also acts as an insulation of the exhaust gas stream from the environment, and because the light-off temperature is reached faster, quicker heating of the downstream catalyst is also brought about by the combustion of at least some of the hydrocarbons. The starting phase of the engine can also be further improved in terms of exhaust gas behavior by electrical heating of the precatalyst. The heating can be effected especially quickly.

In accordance with a concomitant feature of the invention, the precatalyst is conical. This practically partitions off a portion of the mass flow in the vicinity of the outer wall of the tube and carries it to the peripheral region of the downstream catalytic converter. It thus serves as a flow rectifier.

Other features which are considered as characteristic for the invention are set forth in the appended claims.

Although the invention is illustrated and described herein as embodied in a catalytic converter for reducing hydrocarbon in exhaust gases of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
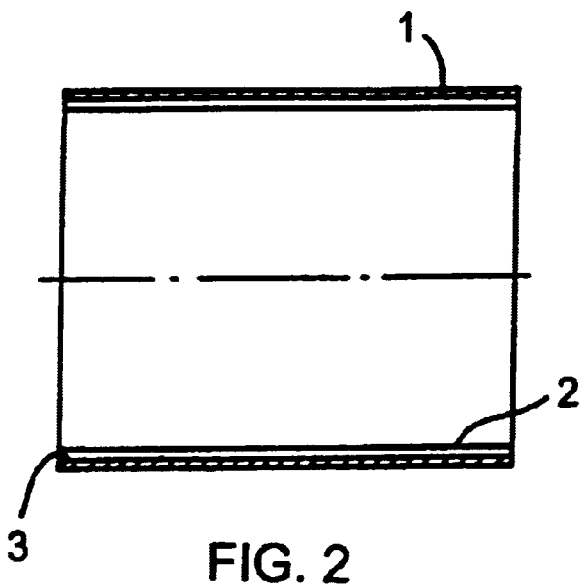
FIG. 2 is a longitudinal sectional view through the catalytic converter.
Figure 1:
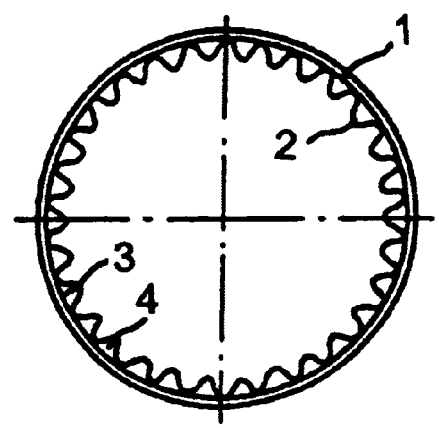
FIG. 1 is a diagrammatic, cross sectional view taken through a catalytic converter according to the invention.

Referring now to the figures of the drawing in detail and first, particularly, to FIGS. 1 and 2 thereof, there is seen a single corrugated metal sheet or foil 2 disposed on the inside surface 3 of a jacket tube 1. The corrugated metal sheet thus forms an enlarged surface area, which can be coated with catalytically active material. The coating may be provided on only the inside of the metal sheet or on both sides. In this embodiment, the heat produced in the catalytic reaction can be easily be dissipated to the jacket tube 1. The efficiency of the configuration can be increased with perforation holes, which are not specifically illustrated here, especially where a catalytically active coating is disposed on both sides of the metal sheet. The corrugated metal sheet 2 together with the jacket tube 1 forms channels 4, which each have a certain cross-sectional area. For honeycomb bodies entirely filled with such channels, the conventional unit is cpsi (cells per square inch), so that in general the size of individual channels can also be referred to by this unit. In the present invention, channels are to be formed with a cross-sectional area of the kind that is utilized in honeycomb bodies with 25 to 200 cpsi. By spirally winding up a plurality of alternatingly stacked, differently structured sheet metal layers, a larger catalytically active area can be created. Care must be taken, however, that the predominant portion of the cross section remain free, to avoid overheating.

Figure 3:
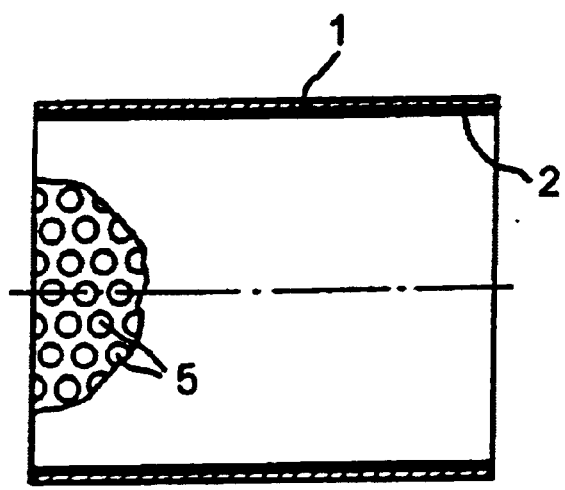
FIG. 3 is a partly broken away, schematic view of another exemplary embodiment of the invention with perforated metal sheets.

FIG. 3 shows that in the simplest case even a single metal sheet 2 with perforation holes 5, can suffice for proper catalytic conversion. The single sheet 2 is disposed on the inside surface 3 of the jacket tube 1.

Figure 4:
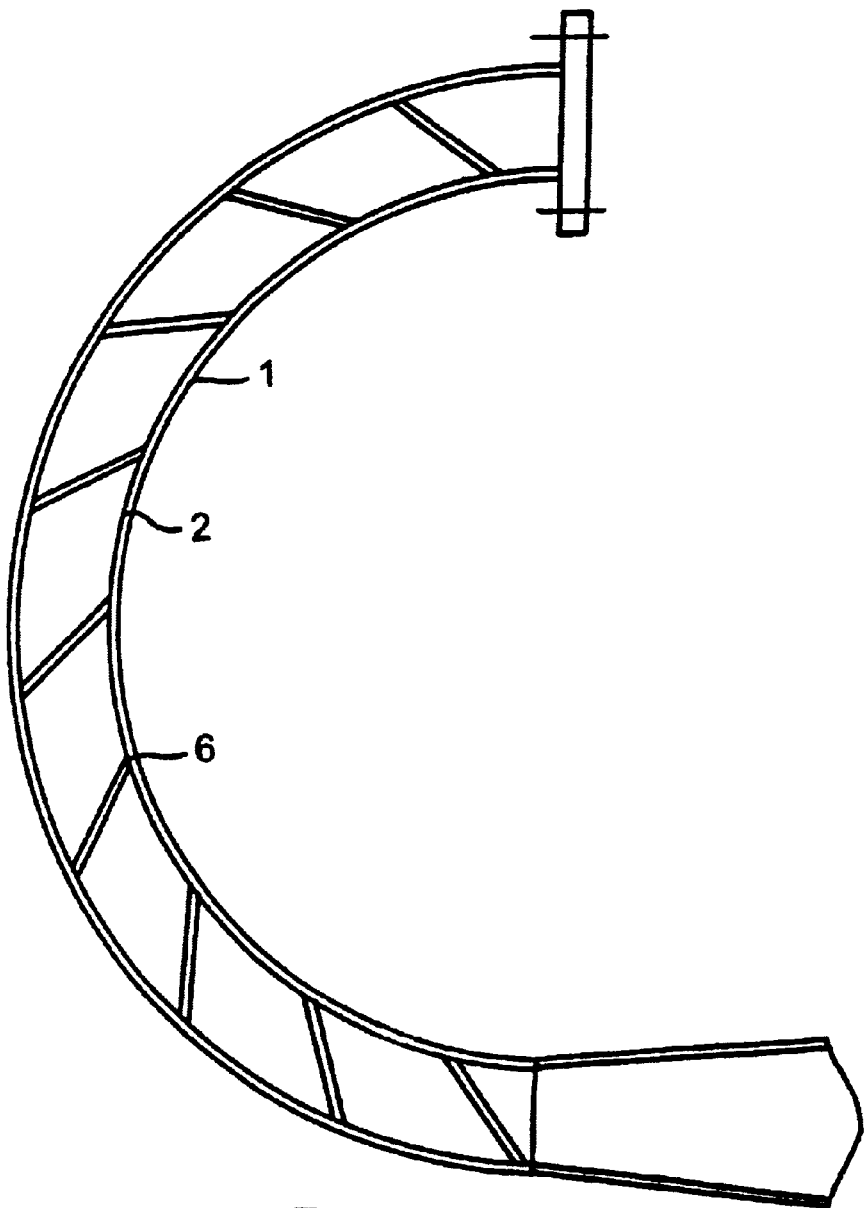
FIG. 4 is a diagrammatic view of a coil-shaped metal sheet in a curved jacket tube.

When there is a limited amount of space available for the catalytic converter, the curved portions of the jacket tubes are advantageously utilized as well, which are present anyway. In FIG. 4, a jacket tube 1 is formed by a curved pipe which accommodates a catalytic converter. A favorable feature here is that it is possible to insert a metal sheet 2 that is made in one piece. The assembly in a curved jacket tube 1 is made considerably simpler thereby. At the same time, good mixing of the exhaust gas must be assured. A flow hindrance suitable for this purpose may for instance be a gap 6 produced in manufacture.

Figure 5:
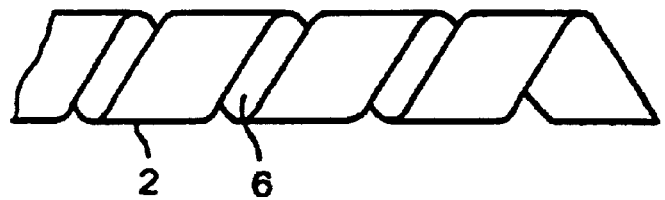
FIG. 5 is a partial elevational view of a helix-shaped metal sheet.

FIG. 5 shows a metal sheet or foil 2, made in one piece, in coil form with associated turbulence and eddy inducing gaps 6.

Figure 6:
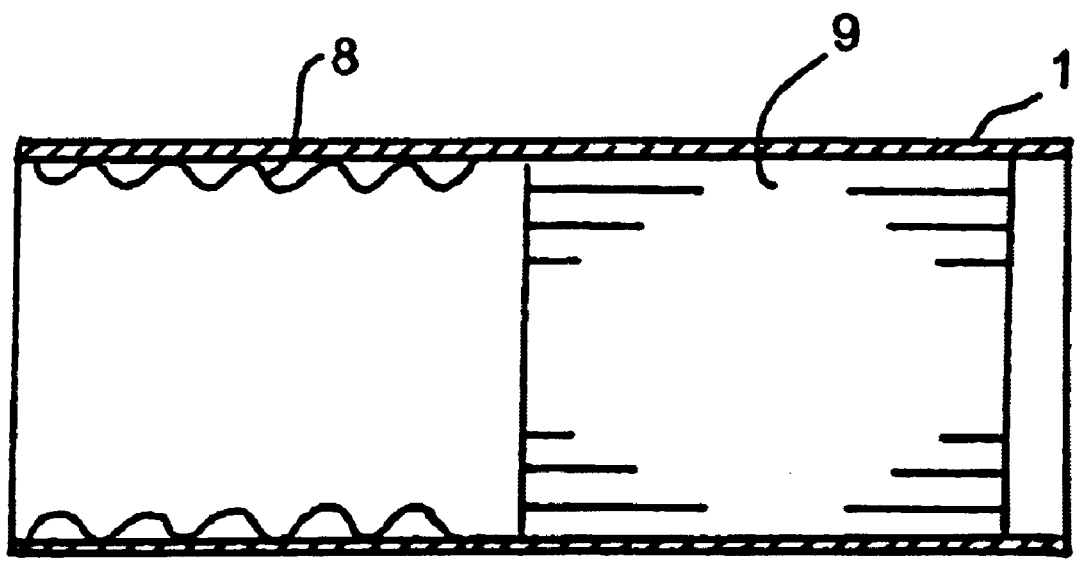
FIG. 6 is a longitudinal sectional view showing a catalytic converter according to the invention in the form of a precatalyst with a downstream main converter.
Figure 7:
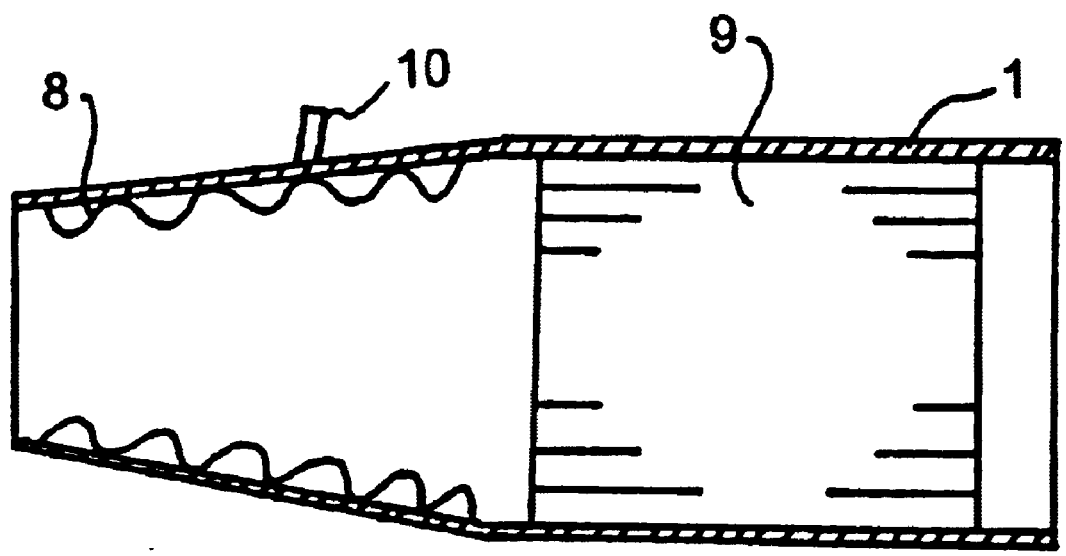
FIG. 7 is a similar view with a conical catalytic converter according to the invention with an electrical connection, in the form of a precatalyst, with a downstream main catalyst.

FIG. 6 shows a catalytic converter of the invention as a so-called precatalyst 8 in combination with a downstream main catalytic converter 9 (the term "downstream" is used relative to an exhaust gas flow along the intended flow direction, i.e. from left to right in FIGS. 6 and 7, for instance). The precatalyst 8 may be spaced apart somewhat from the jacket tube 1. This makes it possible to cause some of the exhaust gas stream to pass between the jacket tube 1 and the precatalyst 8. There, this part serves as an insulating layer to insulate the exhaust gas stream flowing in the interior of the precatalyst 8 from its surroundings. In a most-favorable embodiment, individual corrugations of the metal sheet or metal sheets may rest directly on the jacket tube 1 for the purpose of spacing apart the precatalyst 8. Advantageously, corresponding channels are formed between the jacket tube 1 and the precatalyst 8. In a further embodiment, the spacing may be effected with bumps or similar structures.

FIG. 7 shows a further advantageous feature of a precatalyst 8 with a downstream main catalytic converter 9. Because of its conical shape, the precatalyst 8 effects an evening out of the flow. Because it is capable of subdividing the total exhaust gas flow into partial flows, it can carry the partitioned-off partial flow of exhaust gas particularly to the peripheral regions of the downstream main catalytic converter 9. The partial flow between the jacket tube 1 and the precatalyst 8 is heated by the exothermic conversion of uncombusted hydrocarbons. That heat content then transferred to the peripheral regions of the main catalytic converter 9, which as a result heats up much faster overall, and also more uniformly, until the light-off temperature is reached. The conical precatalyst 8 favorably has a spread angle of about 7° relative to an imaginary central flow line. Experiments have shown that the flow profile with conical widening also develops a favorable mass transport of the exhaust gas in the peripheral regions of the cone. Lesser inclinations, of about 3° to 6°, including 5°, accordingly also produce a more-uniform flow profile. Because of the influence on the flow profile and thus mass transport into peripheral regions of the precatalyst 8 brought about by changes in the Reynolds number (Re=ratio of inertia forces to viscous forces in the flow) and other coefficients, larger angles of conicity of the cone, from about 10° to 15°, may also prove to be advantageous. The shape of the jacket tube 1, located upstream of the precatalyst 8, also has an influence on the flow behavior of the exhaust gas. If there are curvatures in regions near the precatalyst 8, then the cone of the precatalyst 8 may also have quite various angles of incline in different portions, especially in such a way that a cross section of the precatalyst 8 is oval in shape.

The precatalyst 8 is aligned so that it extends approximately parallel to the jacket tube 1. Where it is conically widened, this means that in the middle region, because of the increase in cross section, a somewhat different pressure and mean speed prevail than in the region between the jacket tube and the precatalyst 8. The pressure is advantageously somewhat greater and thus leads to a favorable flow toward and through the peripheral regions of the downstream main catalytic converter 9. The precatalyst 8 as such can be embodied suitably to reinforce this phenomenon. For instance, the corrugation may lead to channels of constant cross section. To achieve a nozzle effect, it is also possible to reduce the cross-section over the length or vice versa to increase it, at least in some regions. As a result, a larger peripheral cross-sectional region can be acted upon with exhaust gas by virtually one channel. The channels or corrugations, in a favorable embodiment, extend not only lengthwise but also in a coil or spiral. The course of the exhaust gas in the precatalyst 8 or between it and the jacket tube 1 is thus lengthened, and results in good conversion of uncombusted hydrocarbons. The main catalytic converter 9 in turn has a spacing from the precatalyst 8 such that its peripheral regions are also acted upon by a high proportion of the exhaust gas mass flow. This leads to fast heating of the main catalytic converter 9. An advantageous feature provides for immediacy between a partial outlet flow from the precatalyst 8 and this partial flow that is then a partial inlet flow in the main catalytic converter 9. To that end, the two may also communicate with one another. In a further development, the precatalyst 8 also has openings or other shapes over its course, particularly in such a way that the exhaust gas passing through them impinges upon larger regions of the main catalytic converter 9. Corresponding guides, such as small walls on the jacket tube 1 and/or the precatalyst 8, advantageously lead to a still more accurate aim of the flowing exhaust gas at the main catalytic converter 9.

An electrical connection 10, which is only schematically indicated in FIG. 7, allows electrical heating of the precatalyst 8. Because of its structural shape, only a small amount of electrical energy is needed. The light-off temperature for the fully effective catalyst is accordingly reached more quickly. Due to the resulting exothermic conversion reaction of exhaust gases, the downstream catalytic converter 9 is more quickly heated by heat content given off by the exothermic reaction in the precatalyst 8. The downstream catalytic converter 9, or course, may likewise be electrically heatable, and it is effective across the entire cross section of the jacket tube 1.

As noted above, the present invention serves in particular to partially reduce the proportion of hydrocaxbon in exhaust gases that have very high proportions of hydrocarbon.

We claim:

1. A catalytic converter for a vehicle with an internal combustion engine, comprising:
   a jacket tube having a wall with an inner surface and defining therein a flow passage with a given cross-sectional area;
   a honeycomb body having a metal sheet disposed in a vicinity of the inner surface of the jacket tube, said metal sheet being at least partially coated with a catalytically active coating effective to convert hydrocarbons in an exhaust gas having a hydrocarbon concentration of up to 4% by volume in the exhaust gas and being disposed such that a predominant, contiguous central portion of the given cross-sectional area of said flow passage remains free of said metal sheet;

said metal sheet being corrugated and defining flow channels having a size and a shape defining a channel density of 25 to 200 cpsi, said central portion being bounded by a corrugated surface of said metal sheet.

2. The catalytic converter according to claim 1, wherein said metal sheet forms at least one sheet metal layer separate from said racket tube and disposed on said inner surface of said jacket tube, said at least one sheet metal layer extending over at least a portion of an inside circumference of said inner surface.

3. The catalytic converter according to claim 1, wherein said jacket tube has an end face and said metal sheet is brazed to said jacket tube at said end face.

4. The catalytic converter according to claim 1, wherein said metal sheet forms two to six structured sheet metal layers defining said flow channels through which exhaust gas of an internal combustion engine can flow.

5. The catalytic converter according to claim 4, wherein said sheet metal layers are spirally wound.

6. The catalytic converter according to claim 4, wherein said sheet metal layers are wound along a helix.

7. The catalytic converter according to claim 1, wherein said metal sheet has perforation holes formed therein.

8. The catalytic converter according to claim 7, wherein said perforation holes have a diameter in a range from 2·mm to 6 mm.

9. The catalytic converter according to claim 7, wherein said metal sheet is brazed in one portion to said inner surface of said jacket tube.

10. The catalytic converter according to claim 1, wherein said jacket tube is a straight jacket tube.

11. The catalytic converter according to claim 1, wherein said jacket tube is a curved jacket tube.

12. The catalytic converter according to claim 1, wherein said jacket tube has a cylindrical cross section.

13. The catalytic converter according to claim 1, wherein said jacket tube widens conically in a flow direction of the exhaust gas.

14. The catalytic converter according to claim 1, wherein said jacket tube has an oval cross section.

15. The catalytic converter according to claim 1, wherein said metal sheet is a high-temperature and corrosion-proof material.

16. The catalytic converter according to claim 15, wherein said material has a composition substantially corresponding to material No. 1.4767.

17. The catalytic converter according to claim 1, which further comprises an electrical connection for electrically heating said honeycomb body of the catalytic converter.

* * * * *